(12) United States Patent
Määttä

(10) Patent No.: US 10,061,359 B2
(45) Date of Patent: Aug. 28, 2018

(54) HINGED DEVICE WITH LIVING HINGE

(71) Applicant: Microsoft Technology Licensing, LLC, Redmond, WA (US)

(72) Inventor: Esa-Sakari Määttä, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/222,076

(22) Filed: Jul. 28, 2016

(65) Prior Publication Data

US 2018/0032109 A1    Feb. 1, 2018

(51) Int. Cl.
*G06F 1/16*   (2006.01)
*E05D 1/02*   (2006.01)
*E05D 5/02*   (2006.01)

(52) U.S. Cl.
CPC ............. *G06F 1/1681* (2013.01); *E05D 1/02* (2013.01); *E05D 5/02* (2013.01); *E05Y 2900/606* (2013.01)

(58) Field of Classification Search
CPC  G06F 1/1681; E05D 1/02; E05D 5/02; E05Y 2900/606
USPC .............................. 403/220–229; 16/221–225
See application file for complete search history.

(56) References Cited

U.S. PATENT DOCUMENTS

| | | | |
|---|---|---|---|
| 1,819,212 A | 8/1931 | Toncray | |
| 1,837,517 A | 12/1931 | Ball | |
| 1,903,923 A | 4/1933 | Hyde | |
| 2,568,225 A | 9/1951 | Doman | |
| 2,709,275 A | 5/1955 | Johnson | |
| 3,016,563 A | 1/1962 | De Jong | |
| 3,562,850 A | 2/1971 | Eliason et al. | |
| 3,588,946 A | 6/1971 | MacDonald | |

(Continued)

FOREIGN PATENT DOCUMENTS

| | | |
|---|---|---|
| CN | 101150938 A | 3/2008 |
| EP | 1659764 A1 | 5/2006 |

(Continued)

OTHER PUBLICATIONS

"Ezy-Jamb invisible hinges," Published on: Jun. 15, 2012, Available at: http://studcosystems.com.au/ezy-jamb-invisible-hinges.html, 2 pages.

(Continued)

*Primary Examiner* — Binh Tran
*Assistant Examiner* — Douglas Burtner
(74) *Attorney, Agent, or Firm* — Klarquist Sparkman, LLP

(57) ABSTRACT

A hinge assembly for a multi-part electronic device comprises a pair of opposing living hinge elements for connecting first and second parts of the multi-part electronic device. Each hinge element has a first segment, an intermediate segment and a second segment, and comprises a first hinged joint positioned at a junction of the first segment and the intermediate segment and defining a first hinge axis, and a second hinged joint positioned at a junction of the second segment and the intermediate segment and defining a second hinge axis. The second hinged joint is spaced apart from the first hinged joint by a length of the intermediate segment. Each of the first and second hinged joints is configured to permit 180 degrees of rotation. A multi-part electronic device having a double-acting hinge arrangement is also described.

20 Claims, 16 Drawing Sheets

(56) References Cited

U.S. PATENT DOCUMENTS

| | | | |
|---|---|---|---|
| 4,301,570 A | 11/1981 | Thomas | |
| RE30,861 E * | 2/1982 | Krawagna | A45C 13/005 16/225 |
| 4,393,541 A | 7/1983 | Hujsak et al. | |
| 4,658,472 A * | 4/1987 | Grenier | E05D 1/02 16/225 |
| 4,991,256 A | 2/1991 | Jeynes et al. | |
| 5,120,030 A | 6/1992 | Lin et al. | |
| 5,631,053 A * | 5/1997 | Andersen | B01F 3/1214 428/36.4 |
| 6,135,530 A * | 10/2000 | Blaszczak | B60R 7/06 16/286 |
| 6,311,367 B1 | 11/2001 | Larsen | |
| 6,484,016 B1 | 11/2002 | Cheon | |
| 6,507,485 B2 | 1/2003 | Zadesky | |
| 6,659,516 B2 | 12/2003 | Wang | |
| 6,798,649 B1 * | 9/2004 | Olodort | G06F 1/1618 235/61 R |
| 6,929,291 B2 | 8/2005 | Chen | |
| 7,097,608 B2 | 8/2006 | Merkli | |
| 7,117,562 B2 | 10/2006 | Zuo et al. | |
| 7,155,266 B2 * | 12/2006 | Stefansen | H04M 1/022 455/575.3 |
| 7,232,313 B1 * | 6/2007 | Shinoda | H01R 35/02 439/31 |
| 7,489,778 B2 | 2/2009 | Lee | |
| 7,593,524 B2 | 9/2009 | Maenpaa | |
| 7,779,509 B2 | 8/2010 | Jian | |
| 7,787,912 B2 | 8/2010 | Saila | |
| 8,019,395 B2 * | 9/2011 | Pan | H04M 1/022 455/575.1 |
| 8,161,604 B2 | 4/2012 | Lin et al. | |
| 8,364,214 B2 | 1/2013 | Jorgensen et al. | |
| 8,451,601 B2 | 5/2013 | Bohn et al. | |
| 8,576,031 B2 | 11/2013 | Lauder | |
| 8,746,645 B2 | 6/2014 | Knych | |
| 9,013,867 B2 | 4/2015 | Becze et al. | |
| 9,264,713 B2 | 2/2016 | Joshi | |
| 9,476,238 B2 * | 10/2016 | Mooers | E05F 1/12 |
| 2002/0004969 A1 * | 1/2002 | Richard | E05D 3/127 16/235 |
| 2004/0134029 A1 | 7/2004 | Horn | |
| 2005/0225393 A1 | 10/2005 | Lee et al. | |
| 2007/0019378 A1 | 1/2007 | Kwon | |
| 2007/0072658 A1 | 3/2007 | Cheng | |
| 2007/0182663 A1 | 8/2007 | Biech | |
| 2007/0234521 A1 * | 10/2007 | Komppa | G06F 1/1616 16/366 |
| 2007/0261798 A1 | 11/2007 | Hung et al. | |
| 2007/0283529 A1 * | 12/2007 | Hashizume | E05D 1/02 16/225 |
| 2008/0037624 A1 | 2/2008 | Walker et al. | |
| 2008/0074858 A1 | 3/2008 | Hori et al. | |
| 2008/0121053 A1 * | 5/2008 | Ijas | H04M 1/0216 74/1.5 |
| 2009/0049646 A1 * | 2/2009 | Rubin | H04M 1/0237 16/319 |
| 2009/0179133 A1 | 7/2009 | Gan et al. | |
| 2009/0265890 A1 | 10/2009 | Endo et al. | |
| 2010/0065702 A1 | 3/2010 | Hsu | |
| 2010/0171671 A1 | 7/2010 | Park | |
| 2010/0246103 A1 * | 9/2010 | Visser | G06F 1/1616 361/679.01 |
| 2010/0252710 A1 | 10/2010 | Yang et al. | |
| 2011/0012858 A1 * | 1/2011 | Brookes | G06F 1/162 345/173 |
| 2011/0126469 A1 | 6/2011 | Uto et al. | |
| 2011/0304250 A1 * | 12/2011 | Ueda | G06F 1/1681 312/326 |
| 2012/0113614 A1 * | 5/2012 | Watanabe | G02F 1/13336 361/810 |
| 2012/0120618 A1 * | 5/2012 | Bohn | G06F 1/1618 361/749 |
| 2012/0307472 A1 | 12/2012 | Bohn et al. | |
| 2013/0010405 A1 * | 1/2013 | Rothkopf | H04M 1/0216 361/679.01 |
| 2013/0021762 A1 * | 1/2013 | van Dijk | G06F 1/1652 361/749 |
| 2013/0068902 A1 | 3/2013 | Huang et al. | |
| 2013/0077211 A1 | 3/2013 | Wang | |
| 2013/0293444 A1 * | 11/2013 | Sano | G06F 1/1616 345/1.3 |
| 2013/0305489 A1 | 11/2013 | Liang | |
| 2013/0342094 A1 * | 12/2013 | Walters | G09F 19/00 312/319.2 |
| 2014/0042293 A1 * | 2/2014 | Mok | G06F 1/1652 248/682 |
| 2014/0112704 A1 * | 4/2014 | Vanska | G06F 1/16 403/112 |
| 2014/0123436 A1 * | 5/2014 | Griffin | H04M 1/0216 16/221 |
| 2014/0174226 A1 * | 6/2014 | Hsu | E05D 3/122 74/98 |
| 2014/0175253 A1 | 6/2014 | Huang et al. | |
| 2014/0196254 A1 * | 7/2014 | Song | E05D 3/14 16/302 |
| 2014/0268533 A1 | 9/2014 | Meyers et al. | |
| 2014/0299602 A1 | 10/2014 | Manssourian | |
| 2014/0328041 A1 | 11/2014 | Rothkopf et al. | |
| 2015/0055287 A1 * | 2/2015 | Seo | G06F 1/1652 361/679.27 |
| 2015/0184438 A1 | 7/2015 | Varadarajan et al. | |
| 2015/0241925 A1 * | 8/2015 | Seo | G06F 1/1681 361/679.27 |
| 2015/0277506 A1 * | 10/2015 | Cheah | G06F 1/1681 361/679.27 |
| 2015/0345194 A1 | 12/2015 | Kadus et al. | |
| 2015/0370287 A1 * | 12/2015 | Ko | G06F 1/1626 361/749 |
| 2015/0378400 A1 | 12/2015 | Sprenger et al. | |
| 2016/0048165 A1 | 2/2016 | Becze | |
| 2016/0090767 A1 * | 3/2016 | Park | E05D 11/10 16/319 |
| 2016/0132075 A1 * | 5/2016 | Tazbaz | G06F 1/1681 361/679.27 |
| 2016/0139635 A1 * | 5/2016 | Gibson | G06F 1/1654 361/679.55 |
| 2016/0187935 A1 * | 6/2016 | Tazbaz | G06F 1/1681 361/679.03 |
| 2016/0195901 A1 * | 7/2016 | Kauhaniemi | G06F 1/1652 361/679.27 |
| 2016/0299532 A1 * | 10/2016 | Gheorghiu | G06F 1/1652 |
| 2016/0324023 A1 * | 11/2016 | Kim | H04M 1/0268 |
| 2017/0060180 A1 * | 3/2017 | Griffin, II | G06F 1/1607 |
| 2017/0060188 A1 * | 3/2017 | Han | G06F 1/1652 |
| 2017/0061836 A1 * | 3/2017 | Kim | G09F 9/301 |
| 2017/0115701 A1 * | 4/2017 | Bae | G06F 1/1652 |
| 2017/0131741 A1 * | 5/2017 | In-Sung | G06F 1/1616 |
| 2017/0145724 A1 * | 5/2017 | Siddiqui | E05F 1/1284 |
| 2017/0145725 A1 * | 5/2017 | Siddiqui | E05F 3/20 |
| 2017/0220066 A1 * | 8/2017 | Ohishi | G06F 1/163 |

FOREIGN PATENT DOCUMENTS

| | | |
|---|---|---|
| EP | 2112311 A1 | 10/2009 |
| EP | 2475154 A1 | 7/2012 |
| EP | 2406939 B1 | 6/2014 |
| WO | WO2012128489 | 9/2012 |

OTHER PUBLICATIONS http://images.pcworld.com/reviews/graphics/products/imported/31044_g3.jpg, Nokia E90 Communicator, downloaded Sep. 13, 2010, 1 page.

http://machinedesign.com/article/sleek-designs-hinge-on-strong-rotary-joints-1104, Machinedesign.com, downloaded Sep. 13, 2010, 5 pages.

http://www.nvtools.co.uk/images/main/main_soss.jpg, SOSS Hinge, downloaded Sep. 13, 2010, 1 page.

(56) References Cited

OTHER PUBLICATIONS

"Invisible Adjustable Hinge with Screws for Doors—160×32mm—Nickel Plated Finish," Retrieved on: Apr. 6, 2016, Available at: http://www.benzoville.com/concealed-hinges/invisible-adjustable-hinge-with-screws-for-doors-/12507/index.aspx, 3 pages.

Kelander et al., "Modeling for High-Speed Interconnects in Mobile Device Hinge Structures," In Proceedings of 1st Electronic System Integration Technology Conference, pp. 485-490.

Khalilbeigi et al., "FoldMe: Interacting with Double-sided Foldable Displays," In Proceedings of Sixth International Conference on Tangible, Embedded and Embodied Interaction, Feb. 19, 2012, pp. 33-40.

"Lenovo Stretches Innovation With New Ideapad Yoga Flip and Fold Device," Jan. 9, 2012, available online at: <http://news.lenovo.com/news-releases/lenovo-stretches-innovation-with-new-ideapad-yoga-flip-and-fold-device.htm>, 2 pages.

Mraz, "Care and feeding of living hinges," http://machinedesign.com/fasteners/care-and-feeding-living-hinges, 3 pages, dated Aug. 19, 2004.

Office Action (with an English translation) for related Chinese Patent Application No. 201110382425.X, 18 pages, dated Dec. 5, 2013.

Office Action (with an English translation) for related Chinese Patent Application No. 201110382425.X, 6 pages, dated Jul. 15, 2014.

"Sell concealed invisible hinge for wooden door," Published on: May 21, 2012, Available at: http://93163.en.ec21.com/offer_detail/Sell_concealed_invisible_hinge_for--18379891.html?gubun=S, 2 pages.

Talocia et al., "Signal integrity constrained optimization of flexible printed interconnects for mobile devices," IEEE, 3:636-641, Aug. 14-18, 2006.

"International Search Report and Written Opinion Issued in PCT Application No. PCT/US2017/042956", dated Sep. 29, 2017, 10 Pages.

\* cited by examiner

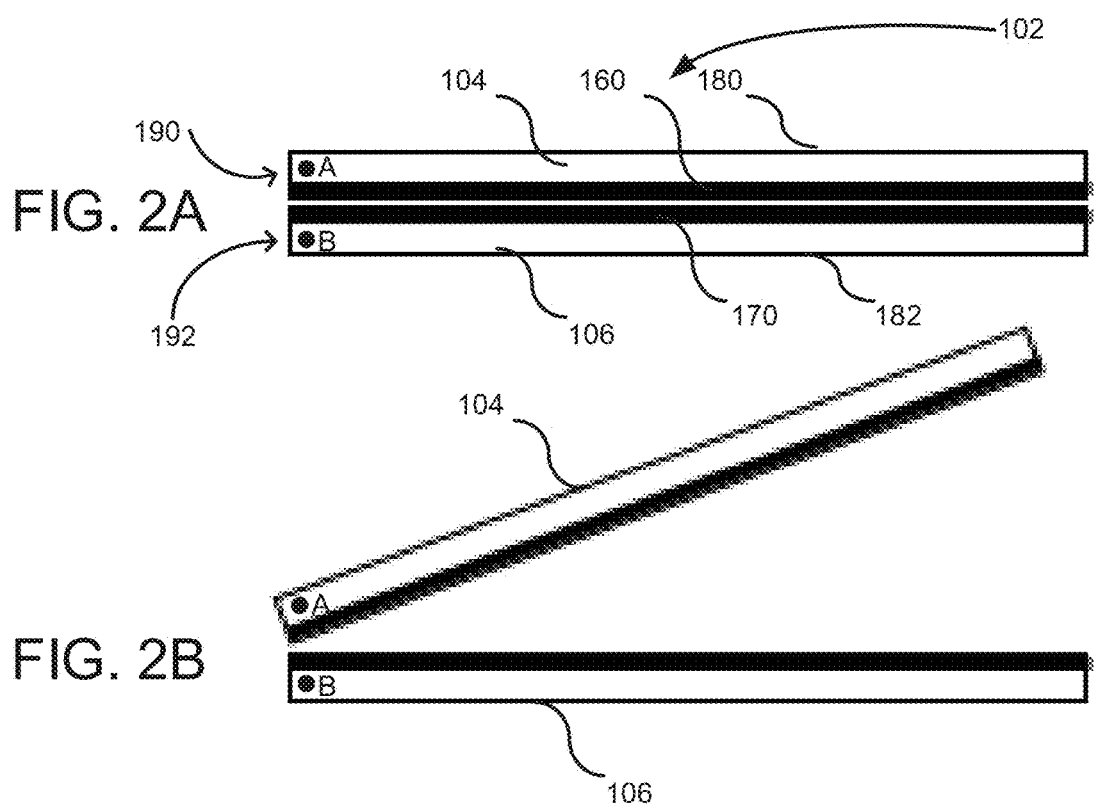
FIG. 2A
FIG. 2B
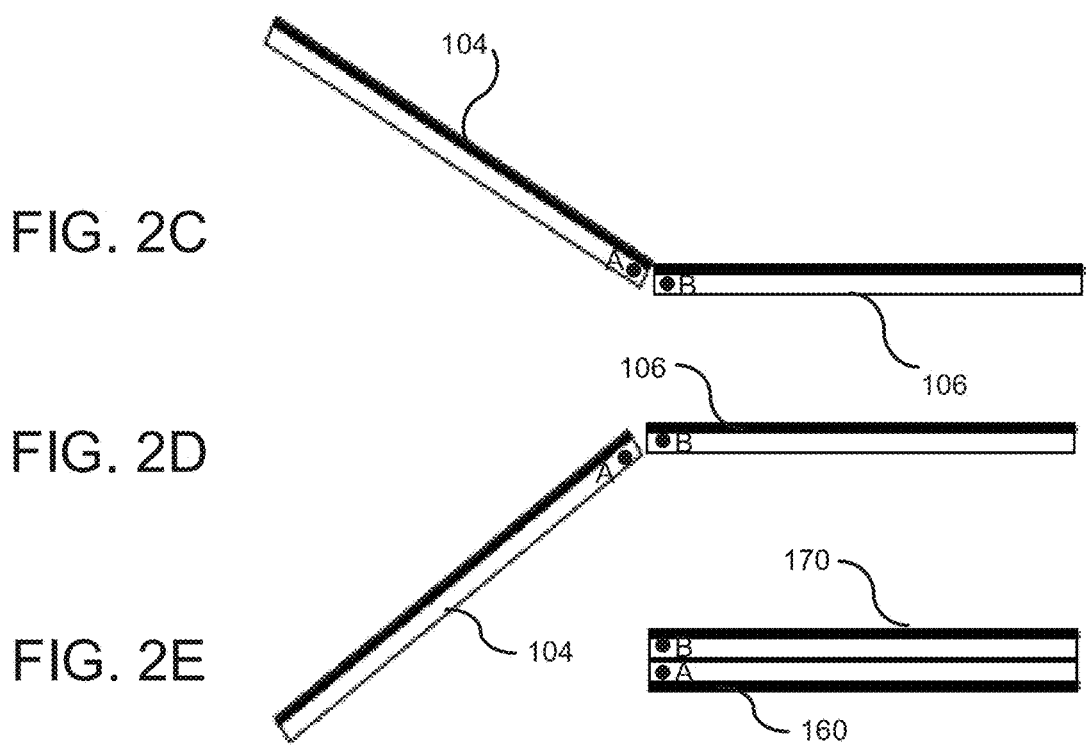
FIG. 2C
FIG. 2D
FIG. 2E

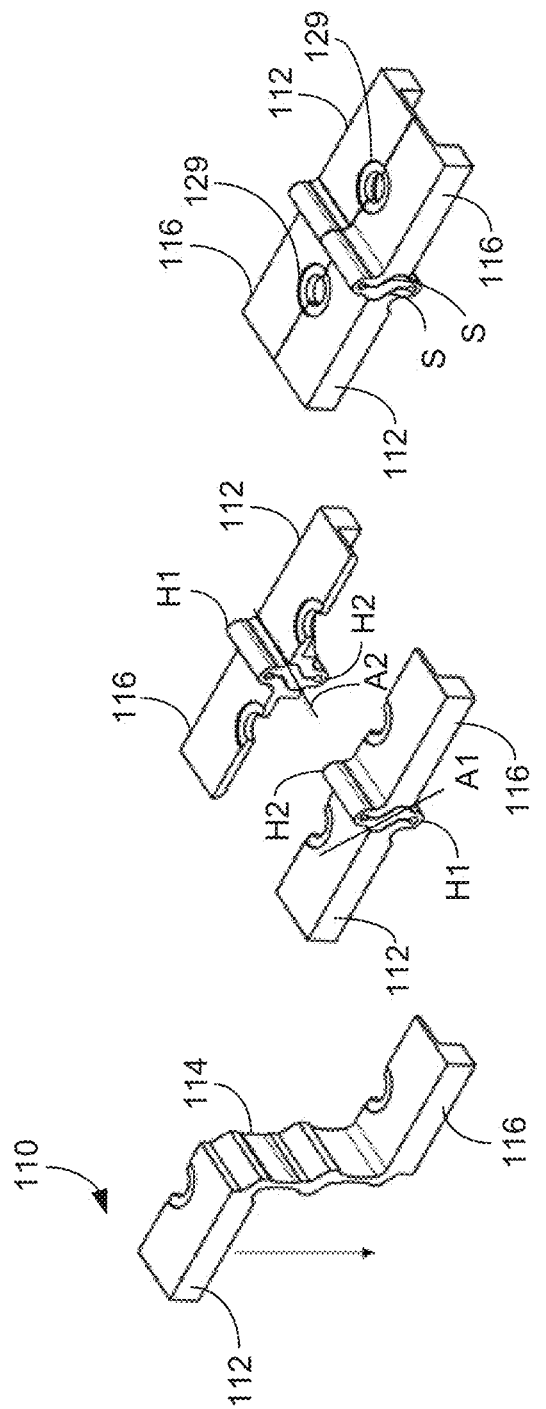

HINGED DEVICE WITH LIVING HINGE

BACKGROUND

Modern electronic devices, including mobile phones, tablets, laptop computers, game controllers and other similar computing devices, have evolved over recent years to the point where they now possess a broad range of capabilities. They are not only capable of placing and receiving mobile phone calls, multimedia messaging (MMS), and sending and receiving email, but they can also access the Internet, are GPS-enabled, possess considerable processing power and large amounts of memory, and are equipped with high-resolution color liquid crystal displays capable of detecting touch input. As such, today's devices are general purpose computing and telecommunication devices capable of running a multitude of applications. For example, modern devices can run web browsers, navigation systems, media players and gaming applications.

Along with these enhanced capabilities has come a demand for larger displays to provide a richer user experience. Mobile phone displays have increased in size to the point where they can now consume almost an entire front surface of a phone. In some cases, further increases in display size would detract from other capabilities of the device, such as its pocket-size form factor.

As a result, multi-part devices are becoming more popular. Multi-part devices have two or more parts that are coupled together, such as by a hinged or sliding arrangement. In many multi-part devices, there are multiple displays that can be positioned adjacent each other to expand the effective display size. In the case of a two-part device with each part having a single display, both displays are face-to-face in a closed position so as to protect the displays. In an open position, the displays are side by side to provide a maximum display area. In a fully-open position, the dual displays are positioned back-to-back so the user can simply rotate the device to view the opposing display.

Hinges for such dual-display devices are problematic. Typically, the hinges can protrude from the device as it moved between positions. As devices continually become thinner, hinges need to be adapted to accommodate the thinner displays without further protrusion from the back of the device as it is opened and closed. Other problems include that the displays do not open and close smoothly.

Therefore, it is desirable to provide improved hinges for multiple display devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for a hinge assembly for a multi-part electronic device, including but not limited to an electronic device with multiple display parts that are connected to each other. The hinge assembly includes a pair of opposing living hinge elements for connecting first and second parts of the multi-part electronic device. Each hinge element has a first segment, an intermediate segment and a second segment. Each hinge element comprises a first hinged joint positioned at a junction of the first segment and the intermediate segment and defining a first hinge axis, and a second hinged joint positioned at a junction of the second segment and the intermediate segment and defining a second hinge axis. The second hinged joint is spaced apart from the first hinged joint by a length of the intermediate segment. Each of the first and second hinged joints is configured to permit 180 degrees of rotation.

In some implementations, the intermediate segment and the first segment are rotatable relative to each other into a first overlapped configuration in which the intermediate segment contacts and overlaps the first segment, and the intermediate segment and the second segment are rotatable relative to each other into a second overlapped configuration in which the intermediate segment contacts and overlaps the second segment. The first and second overlapped configurations can include comprise complementing curved or angled surfaces that nest together.

In some implementations, the first segment is configured for fixed attachment to the first part of the device, the second segment is configured for fixed attachment to the second part of the device, and the intermediate segment extends freely between the first segment and the second segment. The intermediate segment of a first of the pair of opposing living hinge elements and the intermediate segment of a second of the pair of opposing living hinge elements can be arranged in a crossing relationship relative to each other when viewed along one of the hinge axes, such that the crossing relationship maintains a predetermined distance between each first segment and the respective second segment.

The first segment and the second segment can have respective openings sized for receiving fasteners to secure the first and second segments to the respective first and second parts of the electronic device. The length of the intermediate section can be sized according to a depth of the first and second parts of the electronic device. Each of the first segment and the second segment can be configured for attachment to the electronic device at a recessed mounting position recessed from respective outer surfaces.

According to another implementation, a multi-part electronic device comprises at least a first device part and a second device part connected by a double acting hinge arrangement. The first device part has a first display side and a first opposite side, and the second part has a second display side and a second opposite side. The electronic device has at least a first pair of opposing living hinge elements for connecting the first and second device parts. Each hinge element has a first segment, an intermediate segment and a second segment. Each hinge element comprises a first hinged joint positioned at a junction of the first segment and the intermediate segment and defining a first hinge axis, and a second hinged joint positioned at a junction of the second segment and the intermediate segment and defining a second hinge axis. The second hinged joint is spaced apart from the first hinged joint by a length of the intermediate segment. Each of the first and second hinged joints is configured to permit 180 degrees of rotation.

In some implementations, the first segment is configured for fixed attachment to the first part of the device, the second segment is configured for fixed attachment to the second part of the device, and the intermediate segment extends freely between the first segment and the second segment. In some implementations, the first segment and the second segment are connected to the first and second device parts, respectively, with fasteners.

In some implementations, each of the first segment and the second segment is configured for attachment to the electronic device at a recessed mounting position recessed from respective outer surfaces.

In some implementations, the multi-part electronic device includes a first magnetic element positioned in the first device part and a second magnetic element positioned in the second device part. The first and second magnetic elements are positioned adjacent the living hinge elements and configured to attract each other when the device is an open position and to apply a maintaining force tending to keep the device in the open position.

In some implementations, one of the first and second magnetic elements comprises a magnet and the other comprises a magnetic material. In some implementations, at least two soft iron plates are positioned on opposite sides of the magnet and configured to concentrate the magnet's magnetic flux generally within the associated device part.

In another implementation, a multi-part electronic device comprises at least a first device part and a second device part connected by a hinge arrangement. The first device part has a first display side and a first opposite side, and the second part has a second display side and a second opposite side. The electronic device has at least a first pair of opposing living hinge elements for connecting the first and second device parts. Each hinge element has a first segment, an intermediate segment and a second segment. Each hinge element comprises a first hinged joint positioned at a junction of the first segment and the intermediate segment and defining a first hinge axis, and a second hinged joint positioned at a junction of the second segment and the intermediate segment and defining a second hinge axis. The second hinged joint is spaced apart from the first hinged joint by a length of the intermediate segment. The electronic device is configured with an open position in which the first and second device parts are rotated away from each other with the first and second display sides arranged adjacent each other, and is configured to exert an open position force tending to keep the device in the open position.

The foregoing and other objects, features, and advantages will become more apparent from the following detailed description, which proceeds with reference to the accompanying figures.

BRIEF DESCRIPTION OF THE DRAWINGS

FIGS. 2A-2E are side elevation views of the multi-part electronic device shown in a progression of positions from a closed position to a fully open position.

FIGS. 14-16 are perspective views of an implementation of a hinge element and showing the relationship between a pair of hinge elements.

DETAILED DESCRIPTION

Figure 1:
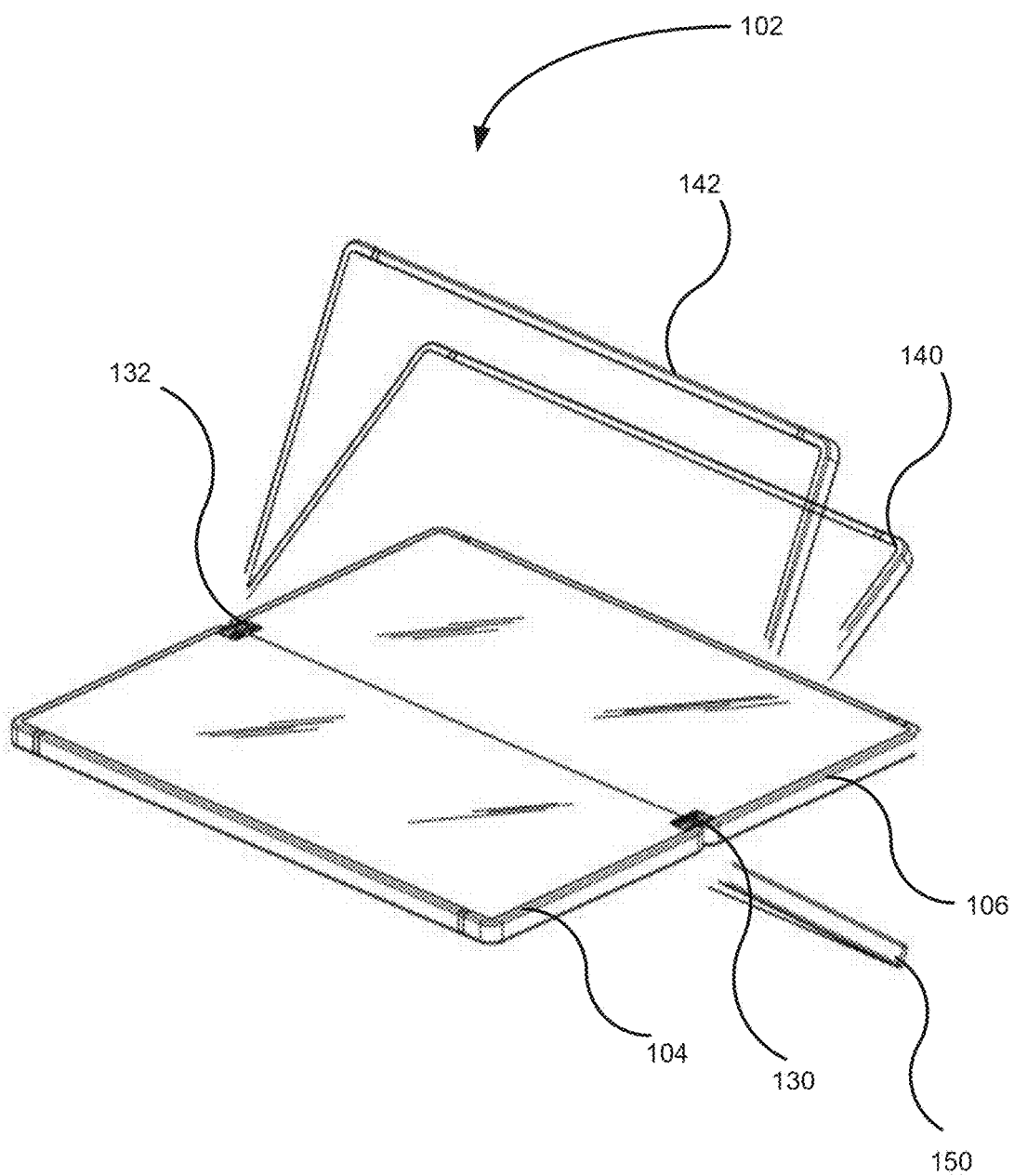
FIG. 1 is a perspective view of a multi-part electronic shown in an open position and in several of its other possible positions.

FIG. 1 is a perspective view of an implementation of a multi-part electronic device 102 having a first device part 104 and a second device part 106 coupled together with one or more hinges, shown schematically at 130, 132. The multi-part electronic device 102 can be, for example, a hand-held device, such as a smart phone, a tablet, a portable computer (such as a lap-top), a game controller or other type of computing or electronic device.

In some implementations, each device part 104, 106 includes at least one display, and displays from both device parts 104, 106 can be positioned adjacent each other so the user can view the multiple displays simultaneously, such as in an open position as shown in FIG. 1 in solid lines. The hinges 130, 132 movably couple the device parts 104, 106 together and allow them to be rotated relative to each other, such as to alternative positions 140, 142 and 150, as just three examples. As described in greater detail below, in some implementations the hinges allow for full rotation. For purposes of brevity, the embodiments described herein are shown for two-display devices, but can be extended to other multi-part devices having three or more device parts.

As stated, the first and second device parts 110, 120 can comprise multiple user interface screens, such as user interface screens 160, 170, respectively, in the example of FIGS. 2A-2E. The screens 160, 170 can be used for user input and/or display purposes. The screens 160, 170 can also be replaced with a plurality of smaller screens and/or other user interface mechanisms, such as a keyboard, trackpad, joy stick, etc. Exemplary implementations of the multi-part electronic device can comprise such user interface mechanisms on any surfaces and on any combination of surfaces as desired.

FIGS. 2A-2E illustrate, from side elevation views, different positions in which the electronic device 102 can be arranged. In the device 102, the first device part 104 comprises the screen 160 on a device face (shown in dark) and an opposing back surface 180. Likewise, the second device part 106 is shown with the screen 170 on a device face (shown in dark) and an opposing back surface 182. Coupled ends or edges of the first and second device parts 104, 106 are shown schematically at 190, 192, respectively. Points A and B have been added to show the relative pivoting motion between the first and second device parts 104, 106. FIG. 2A illustrates a closed position in which the screens 160, 170 are positioned face-to-face. In the closed position, with Point A above Point B, the screens 160, 170 are protected and typically not visible to the user.

FIG. 2B shows the first device 104 opened at an angle of about 30 degrees with respect to the second display device 106. Note that the Point A remains in a position above Point B. In FIG. 2C, the device 102 has been opened further, to an angle of approximately 150 degrees, into nearly the open position of FIG. 1. The FIG. 1 open position is also sometimes referred to as a tablet mode in which the screens 160, 170 are generally positioned in a same plane so as to give an appearance of a single unitary display. The tablet mode represents a relative rotation of 180 degrees.

FIG. 2D shows that the device parts 104, 106 can be rotated relative to each other such that the Point A is rotated past Point B, and past the open position, so as to have a rotation angle of about 230 degrees. In FIG. 2E, the electronic device is shown is in positioned referred to herein as "a fully open position" in the sense that both screens 160, 170 are positioned back-to-back and are visible to the user. The fully open position of FIG. 2E reflects 360 degrees of rotation of one of the device parts 104, 106 relative to the other, compared to the closed position in FIG. 2A. As can be seen, Point A now sits below Point B and the screens 160, 170 are outwardly facing.

Figure 3:
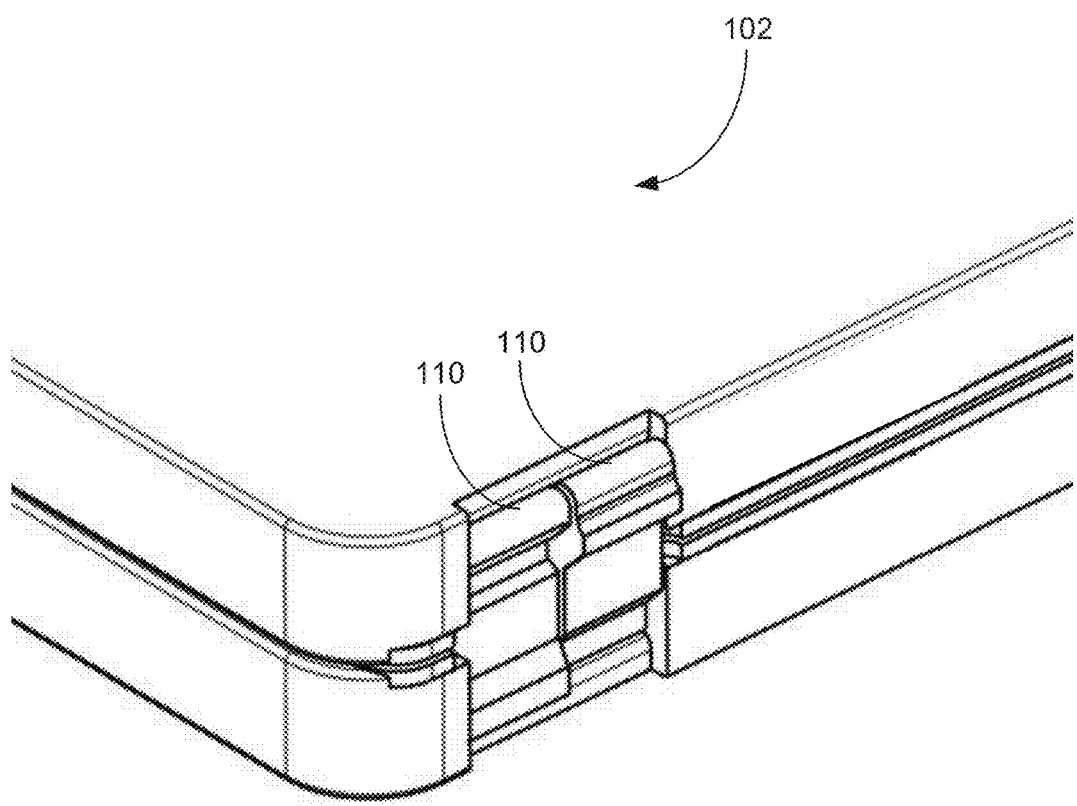
FIG. 3 is a perspective view of the multi-part electronic device showing a pair of the hinge elements.

FIG. 3 is a perspective view of the multi-part electronic device 102 having a hinge assembly 100 according to one implementation that provides for the 360 degrees of rotation to achieve the positions shown in FIGS. 1 and 2A-2E. As described in more detail below, FIG. 3 shows a pair of hinge elements 110, 110, which are arranged to have opposing orientations. For convenience, the hinge elements 110, 110 can be arranged next to each other as shown, although other spacings are possible. Although only a first pair of hinge elements 110, 110 is shown in FIG. 3, typically at least two pairs of hinge elements are used for devices in commonly used sizes. It would of course be possible to configure a device with three or more pairs of hinge elements.

FIGS. 4-10 are section views of a portion of the electronic device 102 showing the hinge assembly 100 in elevation with the first device part 104 and the second device part 106 in different positions relative to each other. For clarity in illustration, only one of the pair of hinge elements 110 is shown in FIGS. 4-10.

Each hinge element 110 can be described as having a first segment 112, an intermediate segment 114 and a second segment 116 (see also FIG. 14, which shows a perspective view of a hinge element 110 in isolation). The first segment 112 is attached to the first device part 104, and typically defines a first end of the hinge element 110. The second segment 116 is attached to the second device part 106, and typically defines a second end of the hinge element 110. There is a first hinged joint H1 defining a first hinge axis about which the device parts can be rotated relative to each other. This first hinged joint H1 defines where the intermediate segment 114 begins. The intermediate segment 114 is hingedly coupled to the first segment 112 at the first hinged joint H1.

Figure 4:
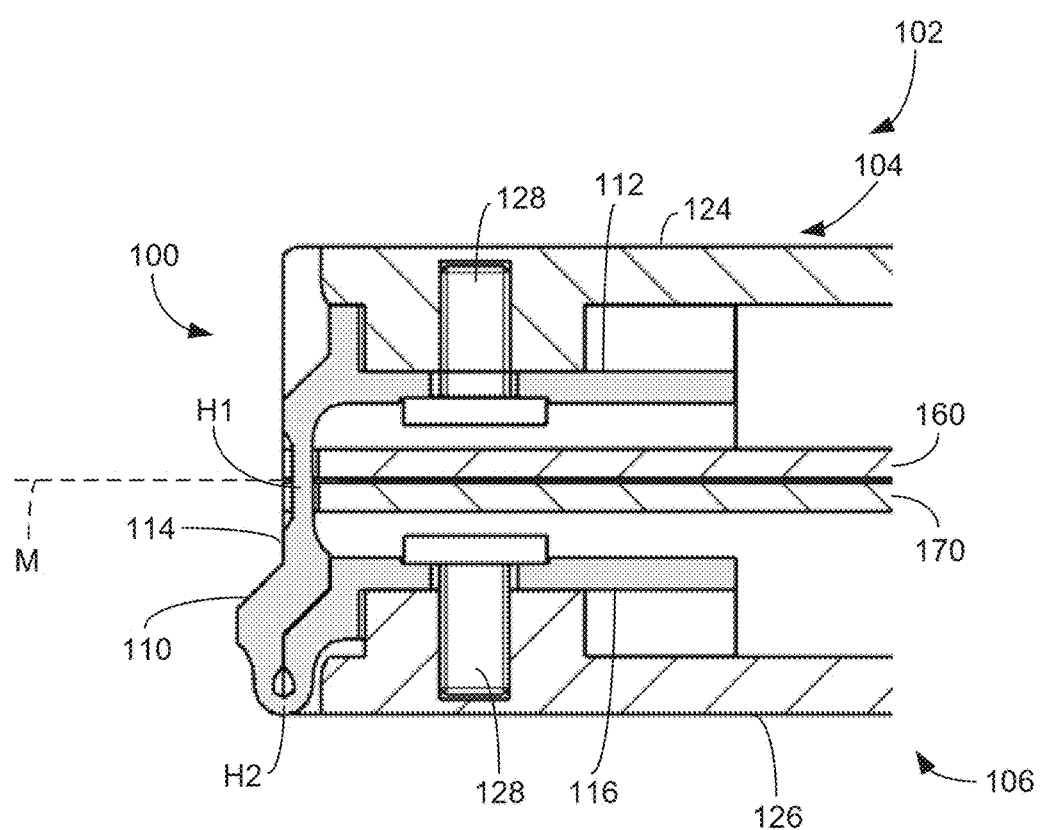
FIGS. 4-10 are section views in elevation of a portion of the multi-part electronic device showing the hinge elements through a range in positions from the closed position, through to the open position and to a fully opened position.

The intermediate segment ends at a second hinged joint H2 at which the intermediate segment 114 is hingedly coupled to the second segment 116. A second hinge axis is defined at the second hinged joint H2. Referring to FIG. 4, the electronic device 102 is shown in the closed position with the screens 160, 170 facing each other and defining a meeting plane M that contains the first hinge axis and passes through the first hinged joint H1.

In some implementations, the hinge element 110 is configured as a living hinge. Typically, a living hinge is a one-piece construction of a single material, e.g., such as a web that can be produced by molding and has defined geometry at selected points to allow the material to flex, bend or fold, and thus provide the desired relative rotation for two components joined by the hinge. For example, the thickness of the material at hinging points can be selected to determine the stiffness of the hinge. A living hinge construction consolidates parts and makes assembly easier. It is advantageous for the construction to consume minimal space and to last for a specified design life. Suitable materials for a living hinge construction include polypropylene and polyethylene, if long life is desired. If a shorter life is acceptable, then materials such as nylon and acetal can be used. En other implementations, constructions other than a living hinge but also offering a simplified approach can be used.

In implementations with a living hinge construction, the first "hinged joint" H1 and the second "hinge joint" H2 fully function as hinging points about which relative rotation can occur, but unlike conventional hinges, they need not be comprised of multiple discrete components or pieces.

Referring again to FIG. 4, the first hinged joint H1 is located approximately at an approximate midpoint of the thinned region 180 of the intermediate segment 114. To the left of the thinned region 180, a relief or recess is provided, which prevents a notch from forming when the first segment 112 and the intermediate segment 114 are folded over each other (see, e.g., the smooth area around the first hinged joint in FIG. 640). The second hinged joint H2 is constructed in the same way as the first hinged joint H1. As can be seen in FIG. 4, the second hinged joint H2, as configured when the intermediate segment 114 is fully folded over the second segment 116, only protrudes beyond the back 126 very slightly, and is smoothly shaped without a notch or kinks. The position of the hinge element 110 in FIG. 4 is shown in perspective in FIG. 3 for the left of the two illustrated hinge elements 110, 110.

As also shown in FIG. 4, the hinge element 110 can be shaped to have complementing surfaces, such as rounded or angled surfaces (FIGS. 4-10; surfaces S in FIG. 16), such that the intermediate segment 114 nests well with the portions of the first and second segments with which it overlaps. As shown in FIG. 4, there is an overlapped configuration of a portion of the intermediate segment 114 shown is overlapped with, and in contact or minimally separated from, the second segment 116.

The first segment 112 and the second segment 116 can each have openings sized to receive fasteners 128 for securing the first and second segments 112, 116 to the first and second device parts 104, 106, respectively.

Figure 5:
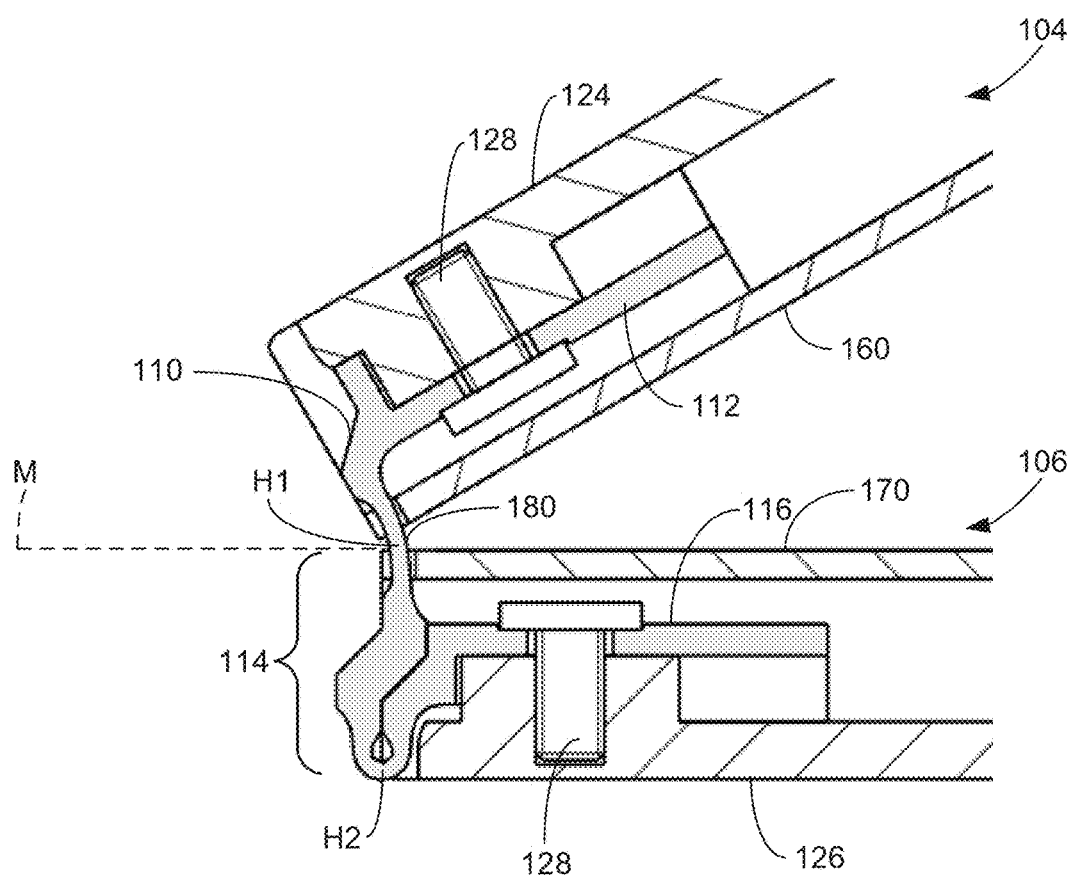
Figure 6:
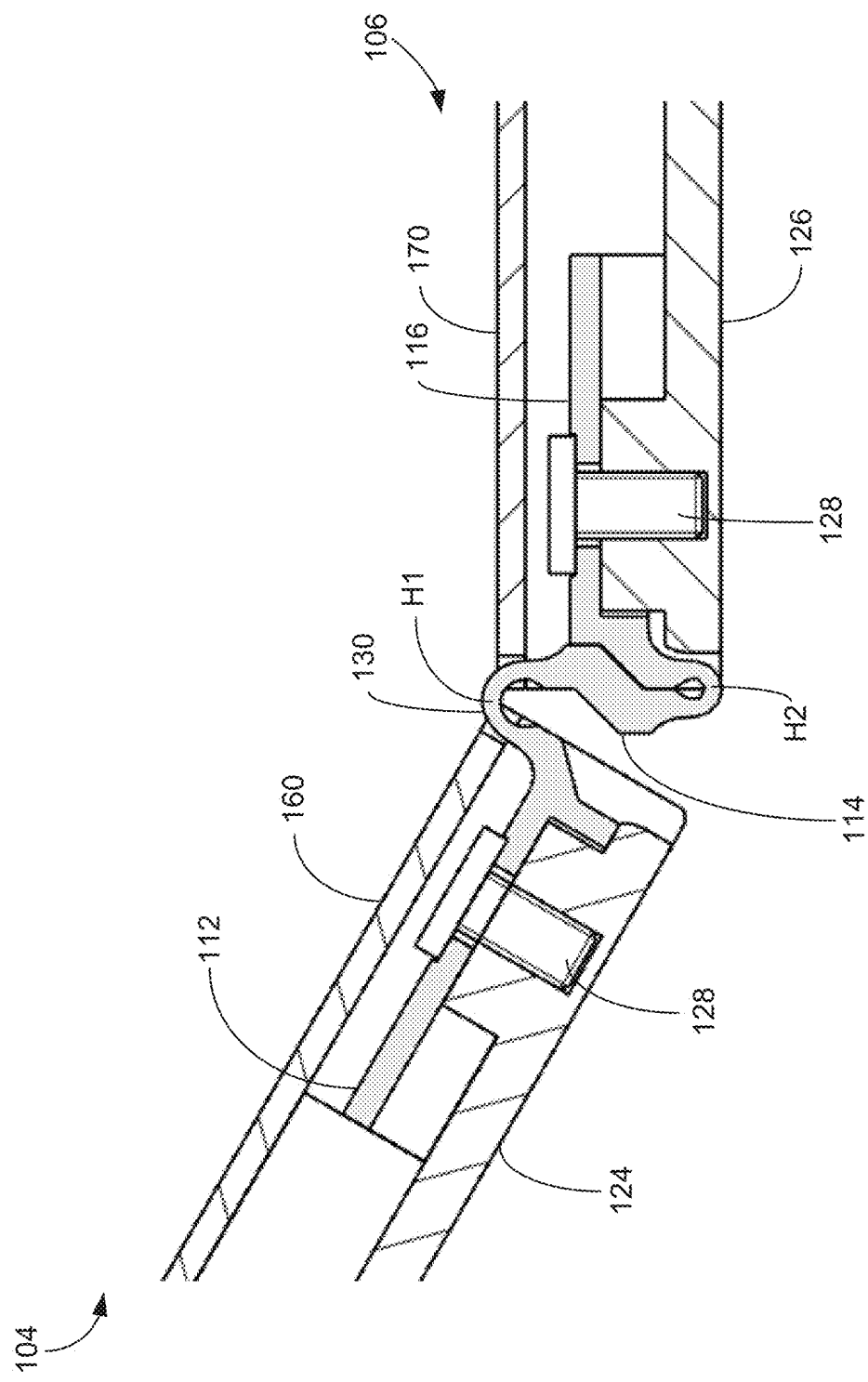

FIG. 5 shows the first device part 104 rotated away from the second device part 106, and shows the hinge element 110 flexing as rotation occurs about the first hinged joint H1. FIG. 6 shows a further rotation of the first device part 104 relative to the second device part 106.

Figure 7:
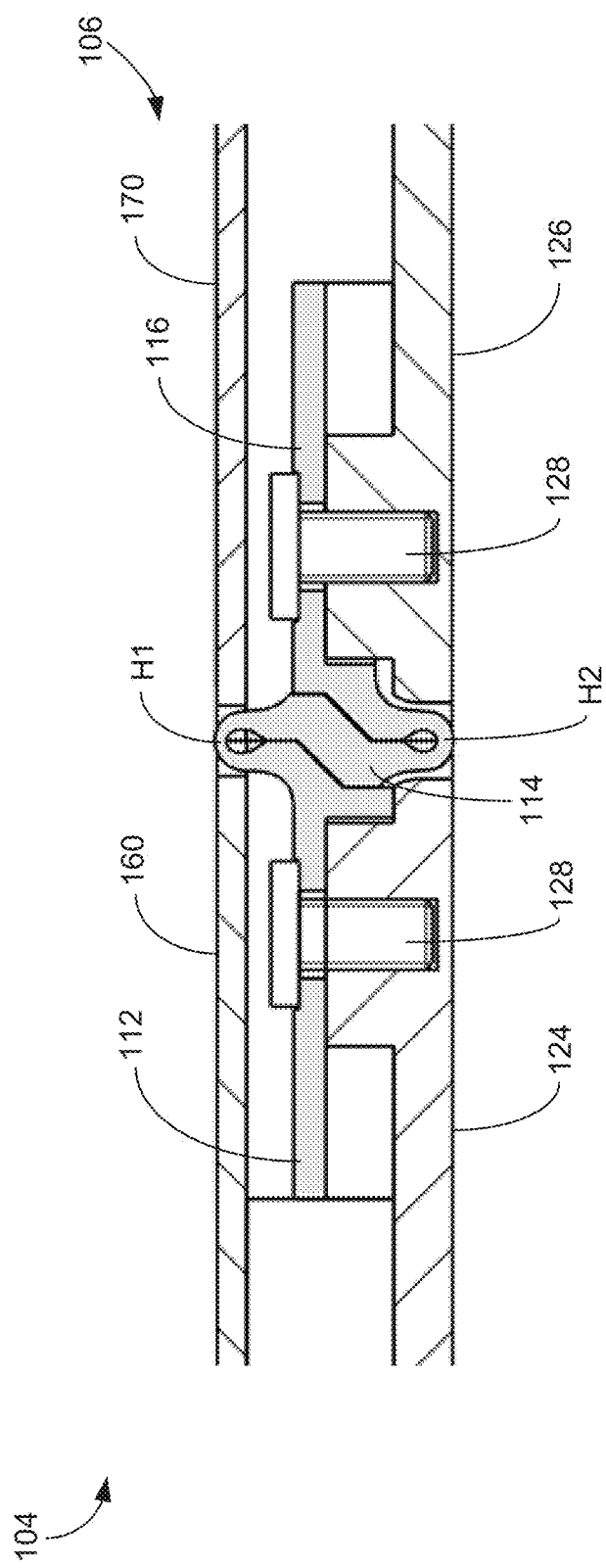

FIG. 7 shows the first device part 104 and the second device part 106 in the open position, following further rotation of the first device part 104. In this position, the first segment 112 has fully rotated relative to and is nested with the intermediate segment 114. Stop surfaces, such as are shown in contact with each other in FIG. 7, can be provided to ensure that over-rotation of the first hinged joint H1 does not occur. Meanwhile, no motion has occurred relative to the second hinged joint H2.

Figure 8:
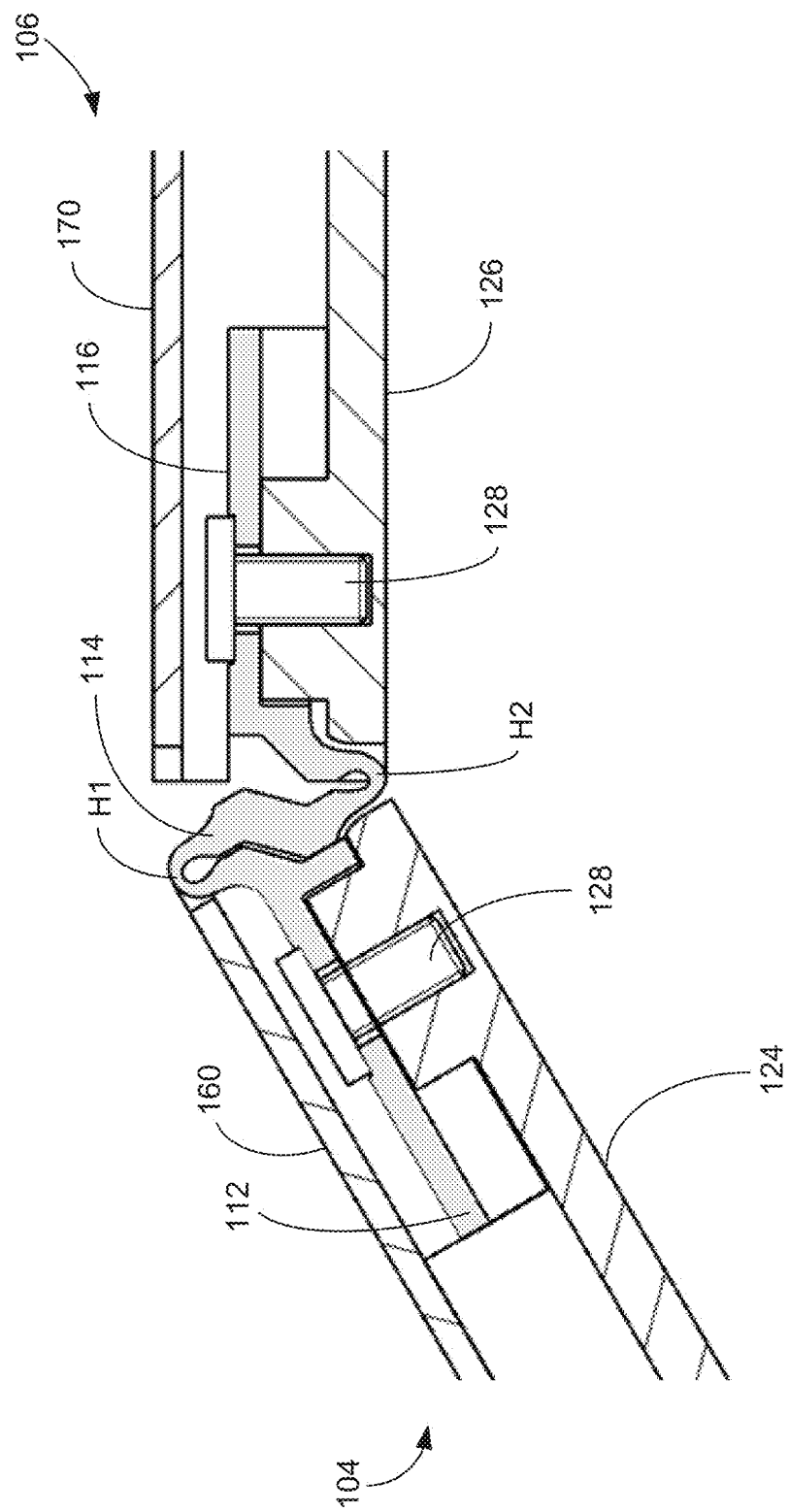
Figure 9:
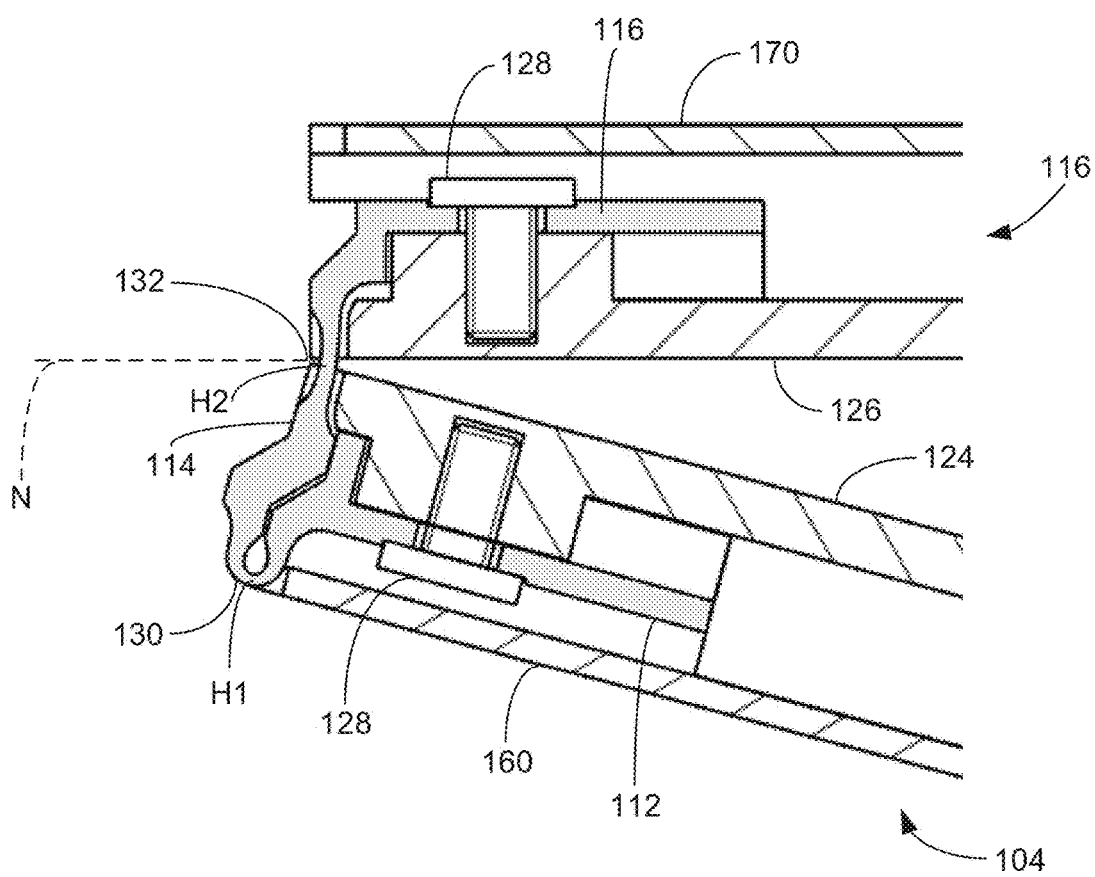

FIG. 8 shows a further rotation of the first device part 104 away from the open position and toward the second device part 106, but the rotation occurs about the second hinged joint H2 and the second hinge axis. Meanwhile, the first hinged joint and the overlapped configuration of the intermediate segment 114 and the first segment 112 remains unchanged. FIG. 9 shows a further rotation about the second hinge axis in which the thinned region 180 of the intermediate segment 114 at the second hinged joint H2 is straightening. A second meeting plane IN is defined as passing through the second hinged joint H2.

Figure 10:
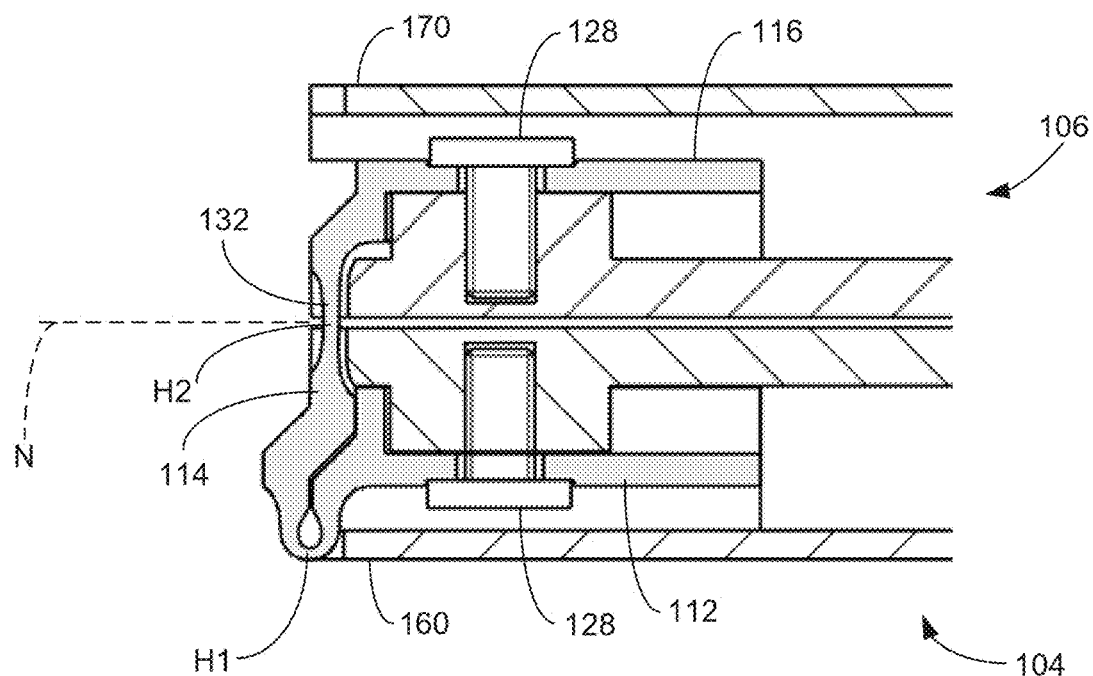

FIG. 10 shows a final rotation of the first device part 104 relative to the second device part 106 to move the device into a fully open position with the screens 160, 170 facing outwardly and the backs 124, 126 facing each other. As can be seen by comparing FIG. 10 to FIG. 7, the first device part 104 has been rotated 180 degrees about the second hinge axis at the second hinged joint H2. Thus, the 180 degrees of rotation about the first hinged joint H1 and the further 180 degrees of rotation about the second hinged joint H2 together make up the 360 degrees of relative rotation between the first device part 104 and the second device part 106. Thus, the device 102 can be described as having a double acting hinge arrangement.

FIGS. 14-16 show the hinge element 110 in perspective on its own (FIG. 14) and as part of a pair of opposing hinge elements (FIGS. 15 and 16). In the illustrated embodiment, as shown in FIGS. 15 and 16, the pair of hinge elements can be formed to contact each other. Further, each of the pair of hinge elements can define a portion of common fastener openings 129 for the fasteners 128 (see, e.g., FIG. 4). As best seen in FIG. 15, the oppositely oriented hinge elements 110 allow for the desired rotation as described above, but constrain each other from extending as shown in FIG. 14. As seen in FIG. 15, one of the intermediate segments extends in a direction A1 and the other of the intermediate segments extends in the direction A2, and thus the intermediate elements are in a crossing arrangement relative to each other when viewed along the hinge axes.

Figure 11:
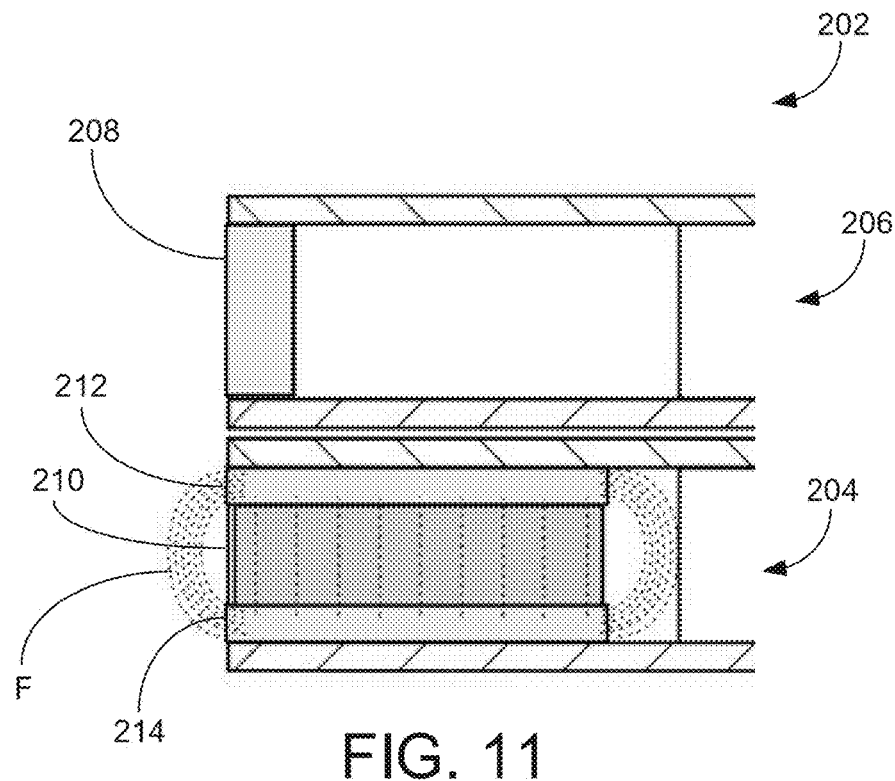
FIGS. 11 and 12 are section views in elevation of a portion of the multi-part electronic device in an implementation having magnetic elements.
Figure 12:
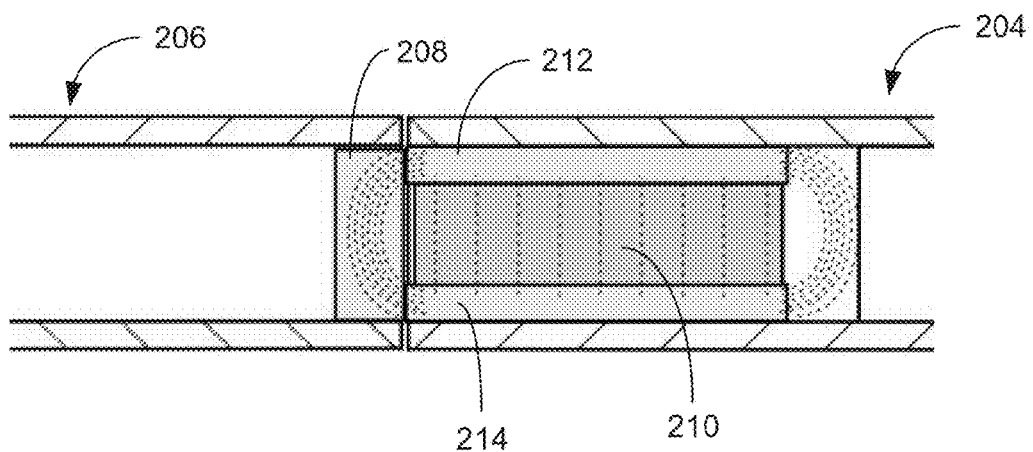

FIGS. 11 and 12 show an electronic device 202 according to another implementation in which force is used to bias the first device part 204 and the second device part 206 into the open position (FIG. 12). For example, one of the device parts 204, 206 can be fitted with a magnetic element (i.e., a magnet or a magnetic material) and the other can be fitted with a corresponding magnetic element. It would also be possible to use springs or another approach to generating a force biasing the device into the open position yet allowing the device to be folded with only low force.

Figure 13:
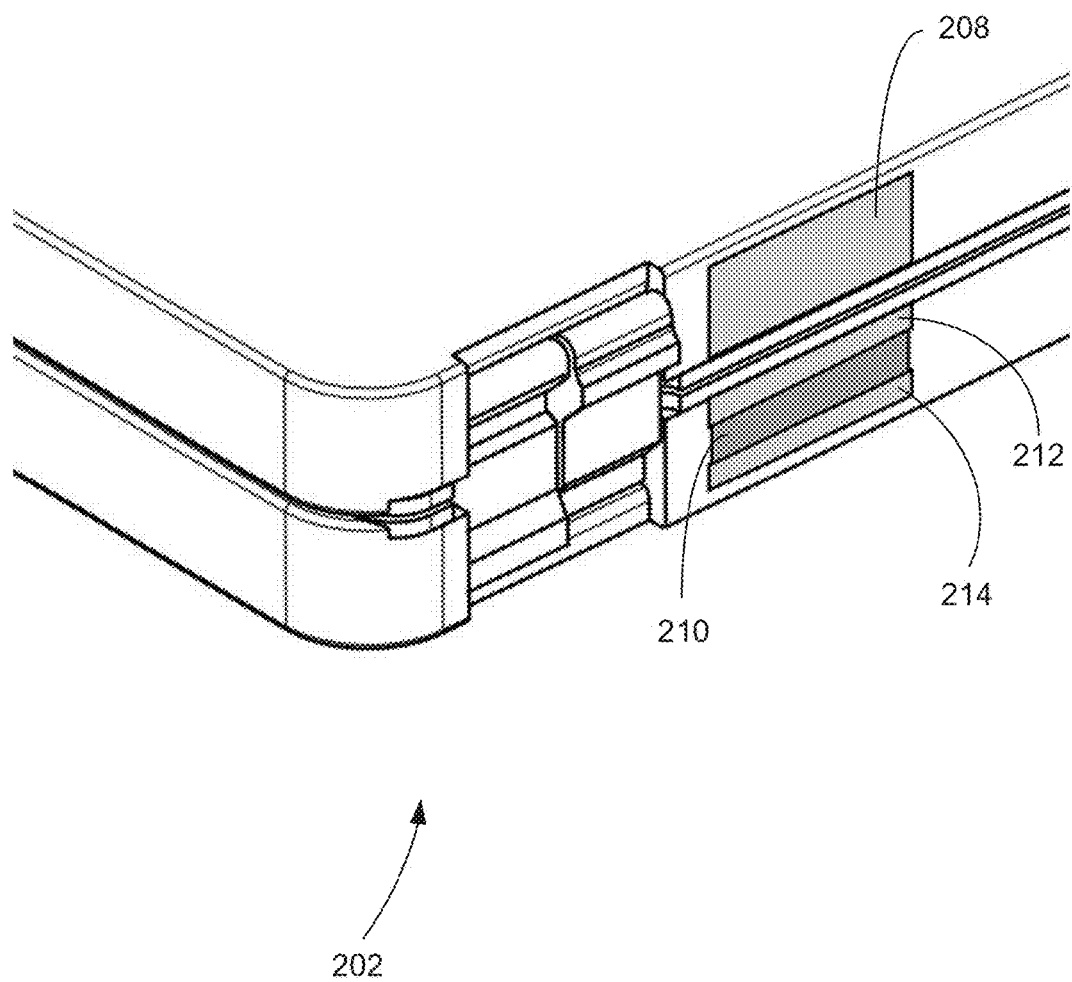
FIG. 13 is a perspective view of a portion of the multi-part electronic device of FIGS. 11 and 12.

In the example of FIG. 11, the device 202 as shown is in either the closed position or the fully open position, and the hinged ends of the device parts 204, 206 are at the left side of the figure. For clarity of illustration, the hinge assembly has been omitted from FIGS. 11 and 12. In the example of FIG. 11, the first device part 204 is provided with a magnet 210 at its hinged end, and the second device part 206 is provided with a magnetic material 208, such as, e.g., a soft iron plate, at its hinged end. To enhance the magnetic force of the magnet 210, it can be positioned between shielding members 212, 214, made of a ferromagnetic material (e.g., soft iron plates). This arrangement tends to confine the magnetic flux F close to the plates. At the same time, this arrangement shields the magnet by reducing the magnetic field. FIG. 13 is a perspective view of one corner portion of the device 202 showing the magnetic elements in relation to each other and adjacent the hinge assembly.

In addition to or instead of the magnetic elements described above, the device can be fitted with a mechanical catch arrangement to retain the device in an open position. The catch can be positioned in the area of the hinge assembly and engaged upon moving the first and second device parts to the open position. A release for the catch can be provided so the user can actuate it to allow the device to be easily folded from the open position to another position, such as the closed position or the fully open position.

Figure 17A:
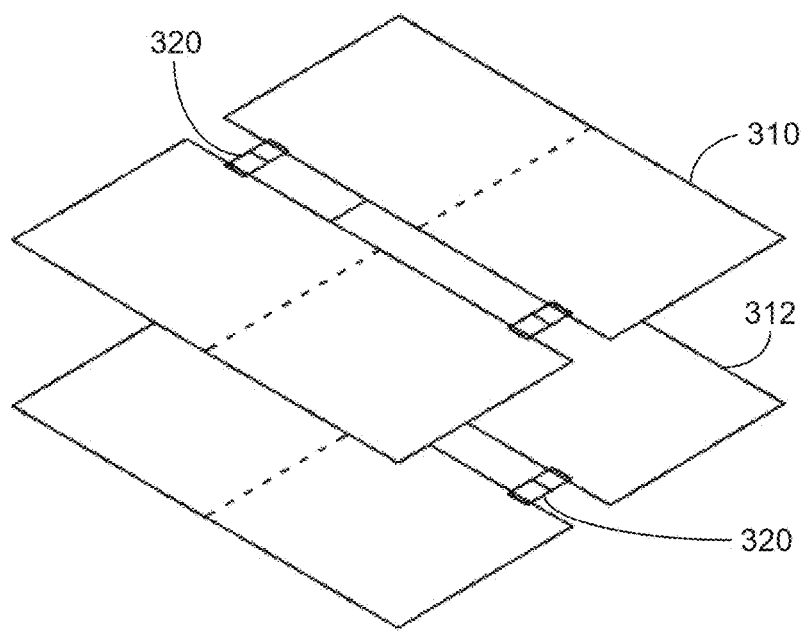
FIGS. 17A-17D are perspective views of another implementation of the hinge elements.

According to another implementation as shown schematically in FIGS. 17A-17E, the hinge elements can be formed integrally with cover or sheet elements. FIG. 17A shows a first sheet 310 and a second sheet 312. Each of the first and second sheets 310, 312 has two hinge elements 320. The dashed lines indicate the approximate midpoints of the sheets 310, 312.

Figure 17B:
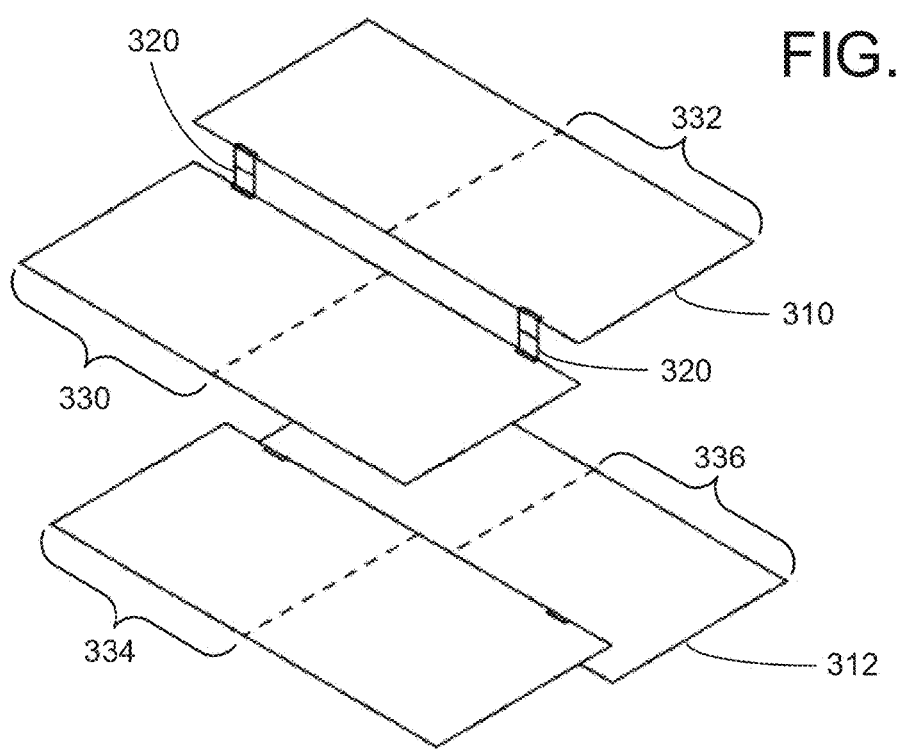

In FIG. 17B, the sheets 310, 312 have been folded into their configuration for installation. The first sheet 310 has a first sheet part 330 and a second sheet part 332, which are separated by the dashed line. The second sheet has a third sheet part 334 and a fourth sheet part 336.

Figure 17C:
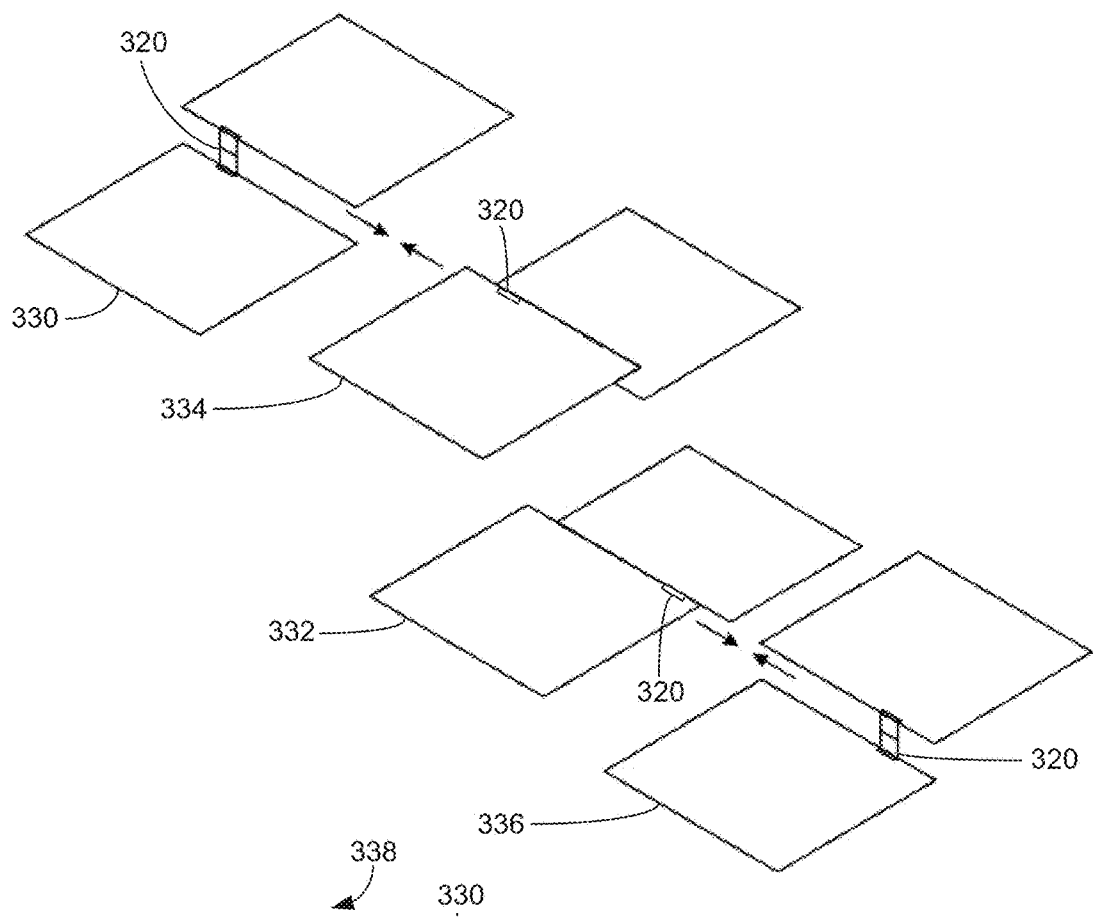

In FIG. 17C, the sheet parts 330 and 332, and 334 and 336, have been separated from each other, such as by a cutting operation. Further, the first sheet part 330 has been aligned for nesting in the direction of the arrows with the third sheet part 334 such that the respective hinge elements will be next to each other and in a crossing arrangement. Similarly, the second sheet part 332 has been aligned for nesting in the direction of the arrows with the fourth sheet part 336 such that the respective hinge elements will be next to each other and in a crossing arrangement.

Figure 17D:
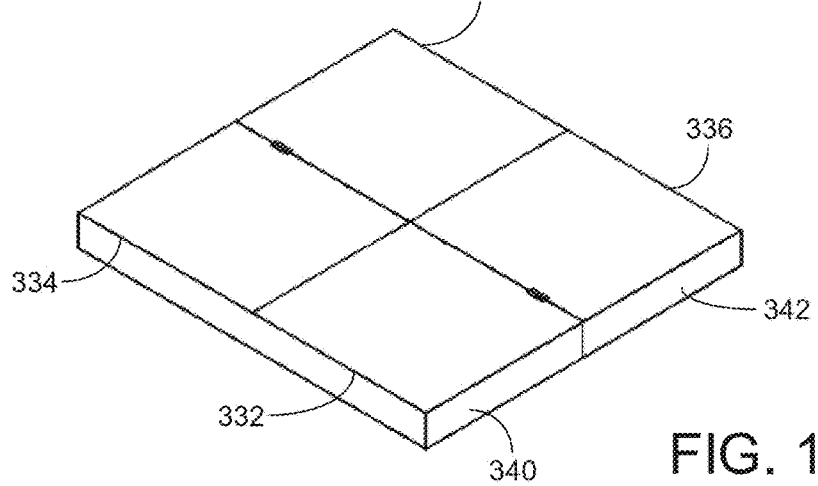
Figure 17E:
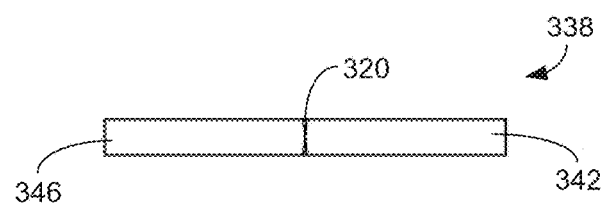
FIG. 17E is an end view of a device having the hinge elements of FIGS. 17A-17D.

In FIG. 17D, the nested sheet part pairs 330, 334 and 332, 336 have been positioned over device parts (or device part intermediates) 340, 342 of multi-part electronic device 338. The sheet parts can adhered to the surfaces. If the sheet parts are installed on exterior surfaces of the finished device parts, then an optically clear adhesive can be used. In some implementations, the sheet parts are installed over an intermediate stage of the multi-part electronic device, such as prior to installation of its screens. FIG. 17E is an end view of the electronic device 338 showing the crossing arrangement of hinge elements 320 created by the nested sheet part pairs.

Figure 18:
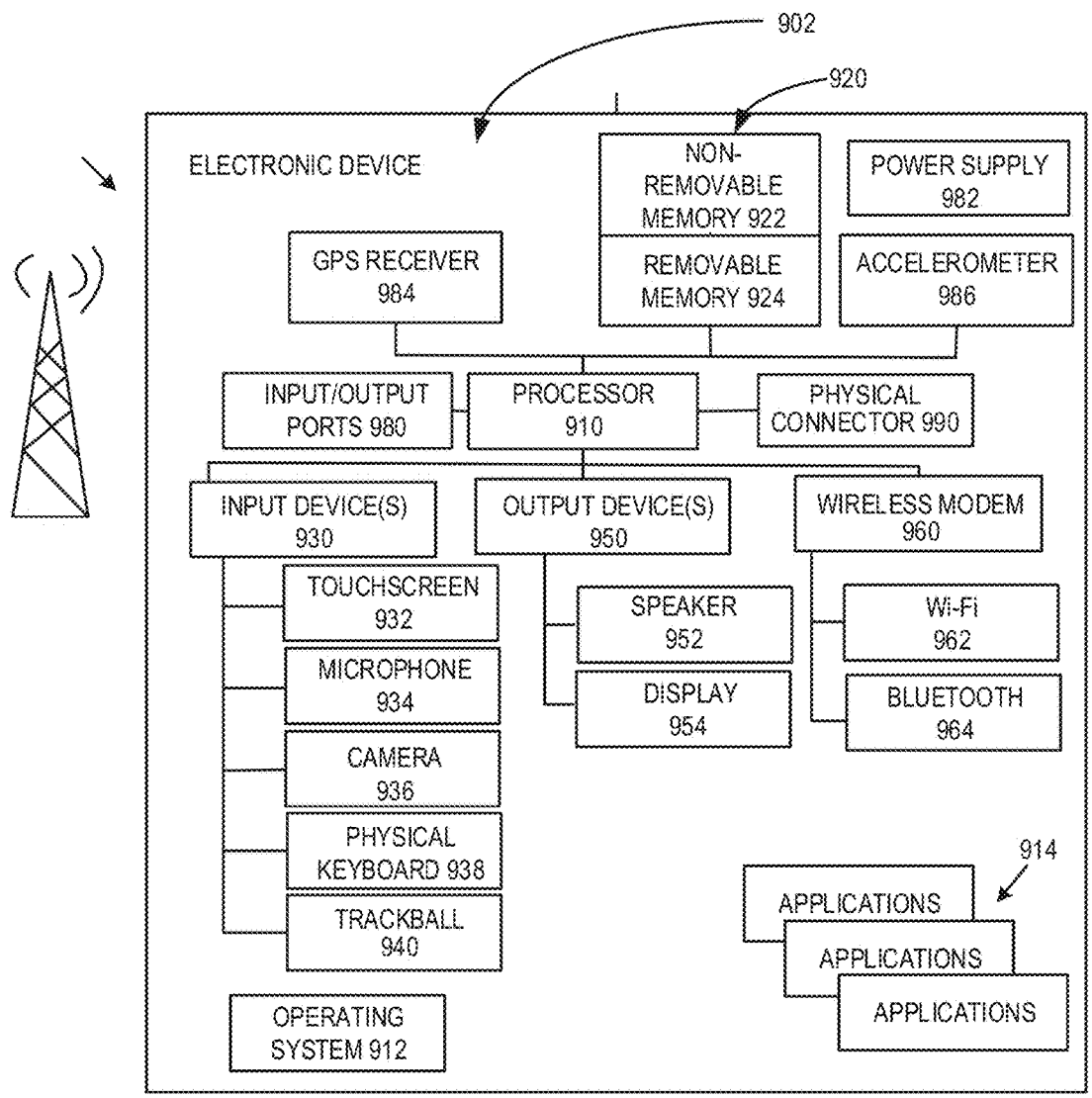
FIG. 18 is a schematic diagram of an electronic or mobile device that can be used with the technologies disclosed herein.

FIG. 18 is a system diagram depicting a representative electronic or mobile device 900 according to any of the above implementations, including a variety of optional hardware and software components, shown generally at 902. Any components 902 in the mobile device can communicate with any other component, although not all connections are shown, for ease of illustration. The mobile device can be any of a variety of computing devices (e.g., mobile phone, smartphone, tablet, handheld computer, Personal Digital Assistant (PDA), laptop computer, game controller, etc.) and can allow wireless two-way communications with one or more mobile communications networks 904, such as a cellular, satellite, or other network.

The illustrated mobile device 900 can include a controller or processor 910 (e.g., signal processor, microprocessor, ASIC, or other control and processing logic circuitry) for performing such tasks as signal coding, data processing, input/output processing, power control, and/or other functions. An operating system 912 can control the allocation and usage of the components 902 and support for one or more application programs 914. The application programs can include common mobile computing applications (e.g., email applications, calendars, contact managers, web browsers, messaging applications), or any other computing application. Functionality for accessing an application store can also be used for acquiring and updating application programs 914.

The illustrated mobile device 900 can include memory 920. Memory 920 can include non-removable memory 922 and/or removable memory 924. The non-removable memory 922 can include RAM, ROM, flash memory, a hard disk, or other well-known memory storage technologies. The removable memory 924 can include flash memory or a Subscriber Identity Module (SIM) card, which is well known in GSM communication systems, or other well-known memory storage technologies, such as "smart cards." The memory 920 can be used for storing data and/or code for running the operating system 912 and the applications 914. Example data can include web pages, text, images, sound files, video data, or other data sets to be sent to and/or received from one or more network servers or other devices via one or more wired or wireless networks. The memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 900 can support one or more input devices 930, such as a touchscreen 932, microphone 934, camera 936, physical keyboard 938 and/or trackball 940 and one or more output devices 950, such as a speaker 952 and a display 954. Other possible output devices can include a piezo electric element (or other type of haptic device). Some devices can serve more than one input/output function. For example, touchscreen 932 and display 954 can be combined in a single input/output device.

The input devices 930 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 912 or applications 914 can comprise speech-recognition software as part of a voice user interface that allows a user to operate the device 900 via voice commands. Further, the device 900 can comprise input devices and software that allows for user interaction via a user's spatial gestures, such as detecting and interpreting gestures to provide input to a gaming application.

A wireless modem 960 can be coupled to an antenna (not shown) and can support two-way communications between the processor 910 and external devices, as is well understood in the art. The modem 960 is shown generically and can include a cellular modem for communicating with the mobile communication network 904 and/or other radio-based modems (e.g., Bluetooth 964 or Wi-Fi 962). The wireless modem 960 is typically configured for communication with one or more cellular networks, such as a GSM network for data and voice communications within a single cellular network, between cellular networks, or between the mobile device and a public switched telephone network (PSTN).

The mobile device can further include at least one input/output port 980, a power supply 982, a satellite navigation system receiver 984, such as a Global Positioning System (GPS) receiver, an accelerometer 986, and/or a physical connector 990, which can be a USB port, IEEE 1394 (FireWire) port, and/or RS-232 port. The illustrated components 902 are not required or all-inclusive, as any components can be deleted and other components can be added.

The following paragraphs further describe implementations of the hinge assembly, and multi-part electronic device:

A. A hinge assembly for a multi-part electronic device, comprising:
a pair of opposing living hinge elements for connecting first and second parts of the multi-part electronic device, each hinge element having a first segment, an intermediate segment and a second segment and comprising:
a first hinged joint positioned at a junction of the first segment and the intermediate segment and defining a first hinge axis, and
a second hinged joint positioned at a junction of the second segment and the intermediate segment and defining a second hinge axis, the second hinged joint being spaced apart from the first hinged joint by a length of the intermediate segment,
wherein each of first and second hinged joints is configured to permit 180 degrees of rotation.

B. The hinge assembly of paragraph A, wherein the intermediate segment and the first segment are rotatable relative to each other into a first overlapped configuration in which the intermediate segment contacts and overlaps the first segment, and wherein the intermediate segment and the second segment are rotatable relative to each other into a second overlapped configuration in which the intermediate segment contacts and overlaps the second segment.

C. The hinge assembly of paragraph B, wherein the first and second overlapped configurations include comprise complementing curved or angled surfaces that nest together.

D. The hinge assembly of any of paragraphs A-C, wherein the first segment is configured for fixed attachment to the first part of the device, the second segment is configured for fixed attachment to the second part of the device, and the intermediate segment extends freely between the first segment and the second segment.

E. The hinge assembly of any of paragraphs A-D, wherein the intermediate segment of a first of the pair of opposing living hinge elements and the intermediate segment of a second of the pair of opposing living hinge elements are arranged in a crossing relationship relative to each other when viewed along one of the hinge axes, and wherein the crossing relationship maintains a predetermined distance between each first segment and the respective second segment.

F. The hinge assembly of any of paragraphs A-E, wherein the first segment and the second segment have respective openings sized for receiving fasteners to secure the first and second segments to the respective first and second parts of the electronic device.

G. The hinge assembly of any of paragraphs A-F, wherein each of the first segment and the second segment is configured for attachment to the electronic device at a recessed mounting position recessed from an outer surface of the electronic device.

H. The hinge assembly of any of paragraphs A-G, wherein each of the first segment and the second segment comprises a sheet configured for attachment to an outer surface of the electronic device.

I. A multi-part electronic device, comprising:
at least a first device part and a second device part connected by a double acting hinge arrangement, the first device part having a first display side and a first opposite side, and the second part having a second display side and a second opposite side, and
at least a first pair of opposing living hinge elements for connecting the first and second device parts, each hinge element having a first segment, an intermediate segment and a second segment and comprising:
a first hinged joint positioned at a junction of the first segment and the intermediate segment and defining a first hinge axis, and
a second hinged joint positioned at a junction of the second segment and the intermediate segment and defining a second hinge axis, the second hinged joint being spaced apart from the first hinged joint by a length of the intermediate segment, wherein each of first and second hinged joints is configured to permit 180 degrees of rotation.

J. The multi-part electronic device of paragraph I, wherein the intermediate segment and the first segment are rotatable relative to each other into a first overlapped configuration in which the intermediate segment contacts and overlaps the first segment, and wherein the intermediate segment and the second segment are rotatable relative to each other into a second overlapped configuration in which the intermediate segment contacts and overlaps the second segment.

K. The multi-part electronic device of paragraph J, wherein the first and second overlapped configurations include comprise complementing curved or angled surfaces that nest together.

L. The multi-part electronic device of any of paragraphs I-K, wherein the first segment is configured for fixed attachment to the first part of the device, the second segment is configured for fixed attachment to the second part of the device, and the intermediate segment extends freely between the first segment and the second segment.

M. The multi-part electronic device of any of paragraphs I-L, wherein the intermediate segment of a first of the pair of opposing living hinge elements and the intermediate segment of a second of the pair of opposing living hinge elements are arranged in a crossing relationship relative to each other when viewed along one of the hinge axes, and wherein the crossing relationship maintains a predetermined distance between each first segment and the respective second segment.

N. The multi-part electronic device of any of paragraphs I-M, wherein the first segment and the second segment are connected to the first and second device parts, respectively, with fasteners.

O. The multi-part electronic device of any of paragraphs I-N, wherein the length of the intermediate section is sized according to a depth of the first and second device parts.

P. The multi-part electronic device of any of paragraphs I-O, wherein each of the first segment and the second segment is configured for attachment to the electronic device at a recessed mounting position recessed from respective outer surfaces.

Q. The multi-part electronic device of any of paragraphs I-P, further comprising a first magnetic element positioned in the first device part and a second magnetic element positioned in the second device part, wherein the first and second magnetic elements are positioned adjacent the living hinge elements and configured to attract each other when the device is an open state and to apply a restraining force tending to keep the device in the open state.

R. The multi-part electronic device of paragraph Q, wherein one of the first and second magnetic elements comprises a magnet and the other comprises a magnetic material.

S. The multi-part electronic device of any of paragraphs R-Q, further comprising at least two soft iron plates positioned on opposite sides of the magnet and configured to concentrate the magnet's magnetic force toward the magnetic material positioned oppositely.

T. A multi-part electronic device, comprising:
at least a first device part and a second device part connected by a hinge arrangement, the first device part having a first display side and a first opposite side, and the second part having a second display side and a second opposite side, and
at least a first pair of opposing living hinge elements for connecting the first and second device parts, each hinge element having a first segment, an intermediate segment and a second segment and comprising:
a first hinged joint positioned at a junction of the first segment and the intermediate segment and defining a first hinge axis, and
a second hinged joint positioned at a junction of the second segment and the intermediate segment and defining a second hinge axis, the second hinged joint being spaced apart from the first hinged joint by a length of the intermediate segment,
wherein the electronic device is configured with an open position in which the first and second device parts are rotated away from each other with the first and second display sides arranged adjacent each other, the electronic device being configured to exert an open position force tending to keep the device in the open position.

In view of the many possible embodiments to which the disclosed principles may be applied, it should be recognized that the illustrated embodiments are only preferred examples and should not be taken as limiting in scope. Rather, the scope of protection is defined by the following claims. We therefore claim all that comes within the scope and spirit of these claims.

I claim:

1. A hinge assembly for a multi-part electronic device, comprising:
a pair of opposing living hinge elements for connecting first and second parts of the multi-part electronic device, each hinge element having a first segment, an intermediate segment and a second segment and comprising:
a first hinged joint positioned at a junction of the first segment and the intermediate segment and defining a first hinge axis, and
a second hinged joint positioned at a junction of the second segment and the intermediate segment and defining a second hinge axis, the second hinged joint being spaced apart from the first hinged joint by a length of the intermediate segment,
wherein each of the first and second hinged joints is configured to permit 180 degrees of rotation.

2. The hinge assembly of claim 1, wherein the intermediate segment and the first segment are rotatable relative to each other into a first overlapped configuration in which the intermediate segment contacts and overlaps the first segment, and wherein the intermediate segment and the second segment are rotatable relative to each other into a second overlapped configuration in which the intermediate segment contacts and overlaps the second segment.

3. The hinge assembly of claim 2, wherein the first and second overlapped configurations include comprise complementing curved or angled surfaces that nest together.

4. The hinge assembly of claim 1, wherein the first segment is configured for fixed attachment to the first part of the device, the second segment is configured for fixed attachment to the second part of the device, and the intermediate segment extends freely between the first segment and the second segment.

5. The hinge assembly of claim 4, wherein the intermediate segment of a first of the pair of opposing living hinge elements and the intermediate segment of a second of the pair of opposing living hinge elements are arranged in a crossing relationship relative to each other when viewed along one of the hinge axes, and wherein the crossing relationship maintains a predetermined distance between each first segment and the respective second segment.

6. The hinge assembly of claim 1, wherein the first segment and the second segment have respective openings sized for receiving fasteners to secure the first and second segments to the respective first and second parts of the electronic device.

7. The hinge assembly of claim 1, wherein each of the first segment and the second segment is configured for attachment to the electronic device at a recessed mounting position recessed from respective outer surfaces of the electronic device.

8. The hinge assembly of claim 1, wherein each of the first segment and the second segment comprises a sheet configured for attachment to an outer surface of the electronic device.

9. A multi-part electronic device, comprising:
at least a first device part and a second device part connected by a double acting hinge arrangement, the first device part having a first display side and a first opposite side, and the second part having a second display side and a second opposite side, and
at least a first pair of opposing living hinge elements for connecting the first and second device parts, each hinge element having a first segment, an intermediate segment and a second segment and comprising:
a first hinged joint positioned at a junction of the first segment and the intermediate segment and defining a first hinge axis, and
a second hinged joint positioned at a junction of the second segment and the intermediate segment and defining a second hinge axis, the second hinged joint being spaced apart from the first hinged joint by a length of the intermediate segment,
wherein each of the first and second hinged joints is configured to permit 180 degrees of rotation.

10. The multi-part electronic device of claim 9, wherein the intermediate segment and the first segment are rotatable relative to each other into a first overlapped configuration in which the intermediate segment contacts and overlaps the first segment, and wherein the intermediate segment and the second segment are rotatable relative to each other into a second overlapped configuration in which the intermediate segment contacts and overlaps the second segment.

11. The multi-part electronic device of claim 10, wherein the first and second overlapped configurations include comprise complementing curved or angled surfaces that nest together.

12. The multi-part electronic device of claim 9, wherein the first segment is configured for fixed attachment to the first device part, the second segment is configured for fixed attachment to the second device part, and the intermediate segment extends freely between the first segment and the second segment.

13. The multi-part electronic device of claim 12, wherein the intermediate segment of a first of the pair of opposing living hinge elements and the intermediate segment of a second of the pair of opposing living hinge elements are arranged in a crossing relationship relative to each other when viewed along one of the hinge axes, and wherein the crossing relationship maintains a predetermined distance between each first segment and the respective second segment.

14. The multi-part electronic device of claim 9, wherein the first segment and the second segment are connected to the first and second device parts, respectively, with fasteners.

15. The multi-part electronic device of claim 9, wherein the length of the intermediate segment is sized according to a depth of the first and second device parts.

16. The multi-part electronic device of claim 9, wherein each of the first segment and the second segment is configured for attachment to the electronic device at a recessed mounting position recessed from respective outer surfaces.

17. The multi-part electronic device of claim 9, further comprising a first magnetic element positioned in the first device part and a second magnetic element positioned in the second device part, wherein the first and second magnetic elements are positioned adjacent the living hinge elements and configured to attract each other when the device is an open position and to apply an open position force tending to keep the device in the open position.

18. The multi-part electronic device of claim 17, wherein one of the first and second magnetic elements comprises a magnet and the other comprises a magnetic material.

19. The multi-part electronic device of claim 18, further comprising at least two soft iron plates positioned on opposite sides of the magnet and configured to concentrate the magnet's magnetic flux generally within the associated device part.

20. A multi-part electronic device, comprising:
at least a first device part and a second device part connected by a hinge arrangement, the first device part having a first display side and a first opposite side, and the second part having a second display side and a second opposite side, and
at least a first pair of opposing living hinge elements for connecting the first and second device parts, each hinge element having a first segment, an intermediate segment and a second segment and comprising:
a first hinged joint positioned at a junction of the first segment and the intermediate segment and defining a first hinge axis, and
a second hinged joint positioned at a junction of the second segment and the intermediate segment and defining a second hinge axis, the second hinged joint being spaced apart from the first hinged joint by a length of the intermediate segment,
wherein the electronic device is configured with an open position in which the first and second device parts are rotated away from each other with the first and second display sides arranged adjacent each other, the electronic device being configured to exert an open position force tending to keep the device in the open position.

* * * * *